United States Patent [19]

Sugino et al.

[11] Patent Number: 4,983,975
[45] Date of Patent: Jan. 8, 1991

[54] A/D CONVERTER

[75] Inventors: Kimihiro Sugino; Mitsumasa Satoh, both of Ohme, Japan

[73] Assignees: Hitachi, Ltd.; Hitachi VLSI Engineering Corp., both of Tokyo, Japan

[21] Appl. No.: 331,289

[22] Filed: Mar. 31, 1989

[30] Foreign Application Priority Data

Apr. 2, 1988 [JP] Japan .................................. 63-81603

[51] Int. Cl.$^5$ ............................................ H03M 1/50
[52] U.S. Cl. ..................................... 341/166; 341/155; 370/32.1; 379/410
[58] Field of Search ....................... 341/155, 166, 167; 370/32.1, 32; 379/406, 410, 411

[56] References Cited

U.S. PATENT DOCUMENTS

| 4,746,902 | 5/1988 | Tol et al. ........................ 370/32.1 X |
| 4,852,081 | 7/1989 | Bonnet et al. ......................... 379/410 |
| 4,945,359 | 7/1990 | Yamakido ......................... 341/155 X |

OTHER PUBLICATIONS

Voice Band Telecommunications ICs, pp. 180–181.
"A Voice Band Codec with Digital Filtering", J. C. Candy et al, IEEE Transactions on Communications, vol. COM-29, No. 6, Jun. 1981, pp. 815–830.
"A Line Terminating Circuit Using the DSP Technique", N. Takami et al, Globecom '87, pp. 1731–1735.

Primary Examiner—William M. Shoop, Jr.
Assistant Examiner—Brian K. Young
Attorney, Agent, or Firm—Fay, Sharpe, Beall, Fagan, Minnich & McKee

[57] ABSTRACT

An A/D converter included in an echo canceller or the like is furnished with a plurality of rate changing filters that receive the output signals of an oversampling A/D conversion circuit in common, the integration phases of the filters are different from each other as they are selectively advanced or retarded for each one of a plurality of predetermined intervals, and further furnished with an output selection circuit by which internal digital signals delivered as outputs from one of the rate changing filters are selectively transmitted according to the desired phase change.

48 Claims, 7 Drawing Sheets

A/D CONVERTER

BACKGROUND OF THE INVENTION

This invention relates to an A/D converter, and to techniques especially effective when utilized, e.g., in oversampling type A/D converters included in subscriber-line transmission equipment disposed in the subscriber circuit of an integrated digital communications network.

Echo cancellers are disposed in the subscriber circuits of an integrated digital communications network or the like. In addition, oversampling type A/D converters are included in echo cancellers.

As shown in FIG. 6, by way of example, the oversampling type A/D converter includes a delta summation type oversampling A/D conversion circuit A/D, which operates in accordance with an oversampling clock signal $\phi os$, and a rate changing filter FIR, which integrates the output signals of the oversampling A/D conversion circuit A/D for fixed divisions of the frequency of the integrated signal in accordance with a sampling clock signal $\phi o$ so as to form output digital signals $DO - Di$ of $(i+1)$ bits.

The oversampling type A/D converter is described in, for example, "ISSCC '86, DIGEST OF TECHNICAL PAPERS" published in February 1986, pp. 180-181.

The present invention is usable in the environments of "A Voice Band Codec With Digital Filtering", *IEEE TRANSACTIONS ON COMMUNICATIONS*, Vol. COM-29, No. 6, June 1981, pp. 815-830, and also usable in "A Line Terminating Circuit Using the DSP Technique", Norio Tomaki et al, *GLOBECOM '87*, pp. 1731-1735.

SUMMARY OF THE INVENTION

In the oversampling type A/D converter of the prior art as stated above, an input analog signal Ain may be, in effect, a digital signal. The input digital signals are sampled by the oversampling A/D conversion circuit A/D and their logic levels decided as the output digital signals $DO - Di$ by the rate changing filter FIR, whereupon the output digital signals are further subjected to a predetermined signal process by a digital signal processor DSP at a succeeding stage. On this occasion, the oversampling clock signal $\phi os$ and the sampling clock signal $\phi s$ are phased-locked with the level-decided sampled data by a digital PLL circuit DPLL. As indicated by a solid line in FIG. 7, the rate changing filter FIR weights the output signals of the oversampling A/D conversion circuit A/D in accordance with a fixed filter coefficient, which has a start point at a time T1. The starting point T1 of the rate changing filter FIR is determined according to the sampling clock signal $\phi s$.

It has been revealed by the inventors of the present application that the following problems are involved in the prior-art oversampling A/D converter as stated above: In order to secure transmission performance in data transmission equipment of an integrated digital communications network including the oversampling A/D converter, the outputs of the rate changing filter FIR need to be subjected to a phase control by the digital PLL circuit DPLL. For realizing the phase control by the digital PLL circuit DPLL, however, it becomes an indispensable condition that the integration phase of the rate changing filter FIR can be controlled directly and finely. Nevertheless, the rate changing filter FIR has the fixed transfer characteristic concerning the filter coefficient, e.g., the weighting coefficient as stated before with respect to FIG. 7. When the starting point of the integration phase is controlled from the time T1 to the time T2 as indicated by a broken line in FIG. 7 by way of example, a considerable period of time is required before the integral action of the rate changing filter FIR is stabilized, and a considerable period of time is required before the phase lock by the digital PLL circuit DPLL is stabilized. For this reason, the phase control of the rate changing filter FIR becomes, in effect, impossible, and the data transmission performance of the communication system including the oversampling A/D converter cannot be enhanced.

An object of this invention is to provide an oversampling type A/D converter or the like in which the integration phase of a rate changing filter can be controlled. Another object of this invention is to enhance the data transmission performance of a digital communication system including an oversampling type A/D converter or the like.

A typical one of the present inventions is briefly summarized as follows: An A/D converter included in an echo canceller, modem, or the like is furnished with a plurality of rate changing filters that receive the output signals of an oversampling A/D conversion circuit in common, the integration phases of the filters are different from each other as they are selectively advanced or retarded for each one of a plurality of a predetermined intervals, and further furnished with an output selection circuit by which internal digital signals delivered as outputs from one of the rate changing filters are selectively transmitted according to the desired phase change.

According to the expedient described above, the integration phase of the rate changing filter of the A/D converter can be, in effect, controlled with the predetermined interval as a unit, so that the phase becomes controllable without developing the conversion error of the prior A/D converter, and the performance of data transmission can be enhanced.

BRIEF DESCRIPTION OF THE DRAWINGS

The above and other objects and novel features of this invention will become apparent from the description of the specification and the accompanying drawings.

DETAILED DESCRIPTION OF THE PREFERRED EMBODIMENT

Figure 1:
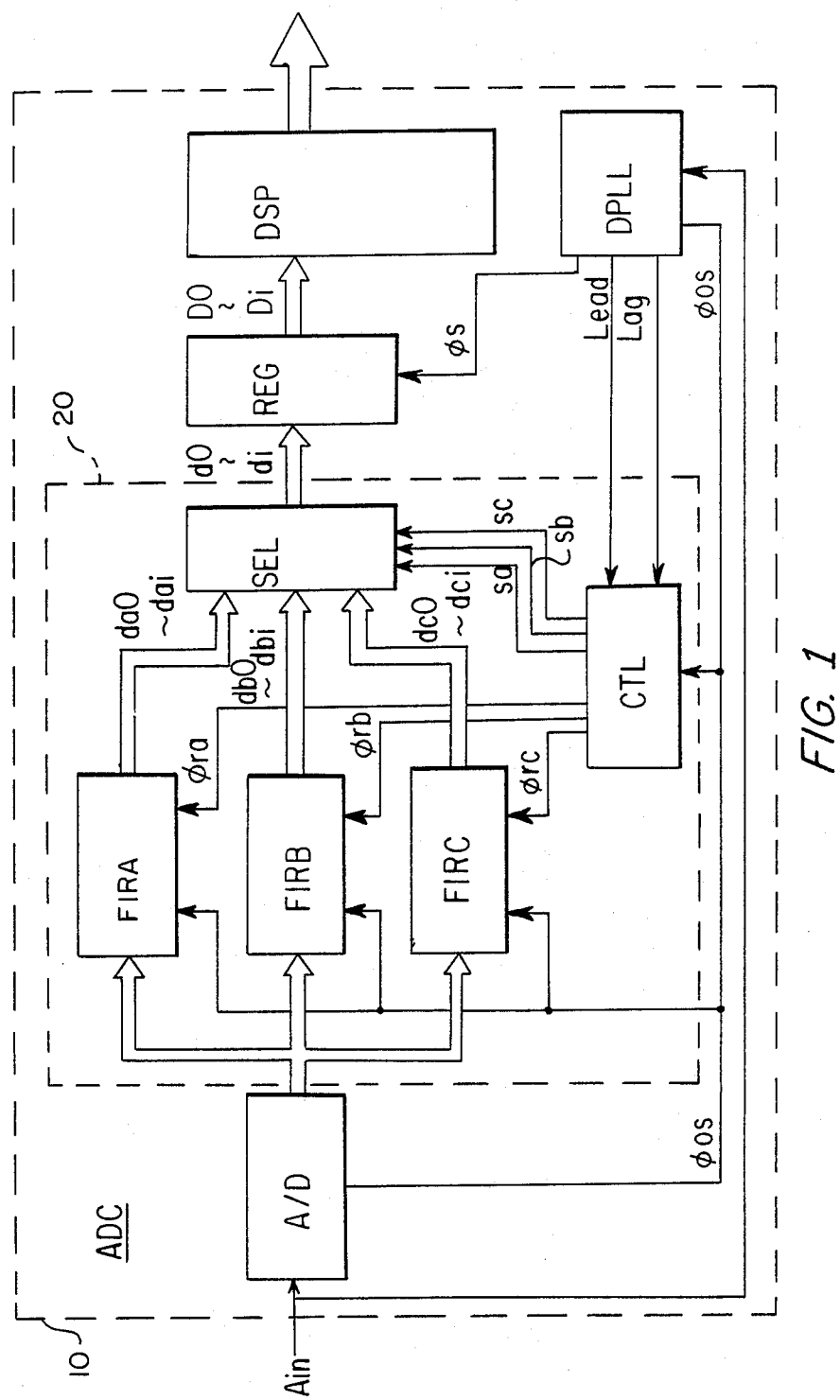
FIG. 1 is a block diagram showing an embodiment of an A/D converter to which this invention is applied.

FIG. 1 is a block diagram of an embodiment of an A/D converter ADC to which this invention is applied. Although not especially restricted, the A/D converter ADC of this embodiment is included in an echo canceller disposed in the subscriber circuit of an integrated digital communications network. Circuit elements constituting various blocks in the figure may be formed on a single semiconductor substrate, such as single-crystal silicon, together with circuit elements constituting the other blocks of the echo canceller as a single chip integrated circuit 10.

Although not especially restricted, the A/D converter ADC of this embodiment includes a single oversampling A/D conversion circuit A/D receiving an input analog signal Ain, and three rate changing filters FIRA through FIRC, which receive the output signals of the oversampling A/D conversion circuit A/D in common. Output digital signals $daO-dai$ through $dcO-dci$ delivered from the rate changing filters are selectively transmitted to a digital signal processor DSP at a succeeding stage by an output selection circuit SEL. On this occasion, with reference to FIG. 2, the rate changing filter whose output signals are selected is set to be a rate changing filter Ftyp, that has the typical integration phase needed to enhance overall performance. In addition, one of the remaining two rate changing filters is set as a rate changing filter Flead that has an integration phase leading one cycle (in the specific example, 64 pulses of $\phi os$ equal one cycle and the frequency of such cycles being $\phi s$) of oversampling clock signal $\phi os$ with respect to that of the rate changing filter Ftyp, and the other is set as a rate changing filter Flag that has an integration phase lagging one cycle of the oversampling clock signal $\phi os$ with respect to that of the rate changing filter Ftyp. During the cycle where Ftyp is selected, Flead and Flag are not used and have time to stabilize with respect to phase lock and integration. The rate changing filter Flead or Flag is, on a succeeding cycle, selectively switched into the rate changing filter Ftyp as needed by being supplied with a corresponding phase control signal "lead" or "lag" from a digital PLL circuit DPLL, to be described later. Thus, the rate changing filter of the A/D converter ADC of this embodiment has, in effect, the integration phase thereof controlled with one cycle of the oversampling clock signal $\phi os$ as a unit.

In FIG. 1, the input analog signal Ain received through the hybrid circuit and input filter or the like, not shown, of the signal converter echo canceller, modem or the like is supplied to the input terminal of the oversampling A/D conversion circuit AD. In an echo cancellor, digital signals that have become distorted during transmission are considered as analog signals and converted to undistorted digital signals for use or retransmission like in a repeater. A modem, at the receiving end of a facsimile transmission, e.g., will receive the transmitted analog signals and reconvert them to digital form. The oversampling A/D conversion circuit A/D is further supplied with the oversampling clock signal $\phi os$. This oversampling clock signal has its frequency set at, for example, 5.12 MHz, though no special restriction is intended.

Although not especially restricted, the oversampling A/D conversion circuit A/D is constructed as a Delta Summation type A/D conversion circuit, which samples the input analog signal Ain in accordance with the oversampling clock signal $\phi os$ and then converts the sampled signal into a digital signal of low accuracy composed of, for example, 3 bits.

The low-accuracy digital signals outputted from the oversampled A/D conversion circuit A/D are supplied to the input terminals of the rate changing filters FIRA through FIRC in common, that is each of the filters FIRA, FIRB and FIRC receives the same input signal. These rate changing filters are supplied with the oversampling clock signal $\phi os$ in common, and they are respectively supplied with corresponding reset signals $\phi ra$ through $\phi rc$ from a control circuit CTL to be described later. Although not especially restricted, these reset signals have their frequencies set at, for example, 80 KHz, and they are respectively endowed with predetermined phase differences relative to a sampling clock signal $\phi s$ having a frequency equal to that of the timing signals $\phi ra$ through $\phi rc$ as will be described later.

Although not especially restricted, each of the rate changing filters FIRA through FIRC includes two integration circuits and one differentiation circuit each of which consists of an adder and a delay unit and which are connected in series. Each of the rate changing filters subjects the low-accuracy digital signals supplied from oversampling A/D conversion circuit A/D, to weighting based on a predetermined filter coefficient, whereupon it integrates the weighted signals for repeat cycles of a lower frequency than the frequency of the integrated signal, so as to form the corresponding ones of the internal digital signals $daO-dai$ through $dcO-dci$. On this occasion, each of the rate changing filters FIRA through FIRC of this embodiment has the following transfer function Fs:

$$Fs=[(1-Z^{-n})/(1-Z^{-1})]^2$$

Here, n denotes the rate changing ratio of the rate changing filter $\phi os/\phi s$, the value of which becomes, for example, 64 in case of this embodiment. In addition, $Z^{-1}$ is given by:

$$Z^{-1}=e^{-p}$$

when the exponent p is expressed by:

$$p=jw/fos$$

where fos denotes the frequency of the oversampling clock signal $\phi os$. Therefore, it is seen that the filter circuit processes the signal according to a time dependent transfer function, that is, one that varies with time and is repeated at intervals. Further, the rate changing filters FIRA through FIRC are controlled so as to have the predetermined integration phase difference between them in such a way that the integral actions (transfer functions) thereof are reset as to starting times repeatedly by each of the pulses of the respectively corresponding timing signals $\phi ra$ through $\phi rc$ respectively as will be described later.

The internal digital signals $daO-dai$ through $dcO-dci$, respectively output from the rate changing filters FIRA through FIRC, are supplied to the corresponding input terminals of the output selection circuit SEL. This output selection circuit SEL is supplied with selection control signals sa through sc from the control circuit CTL. Only one of the selection control signals sa through sc is selectively brought to a high level at any given time.

The output selection circuit SEL transmits only one of the three internal digital signals daO—dai, dbO—dbi, deO—dci supplied from the rate changing filters FIRA through FIRC, to an output memory, e.g., registered REG selectively in accordance with one of the selection control signals sa, sb, sc respectively for storing the selected one of the internal digital signals. More specifically, when the selection control signal sa is set at the high level, the output selection circuit SEL selects the internal digital signals daO—dai supplied from the corresponding rate changing filter FIRA and transmits them to the output register REG as digital signals dO—di, though no special restriction is meant. Likewise, when the selection control signal sb or sc is set at the high level, the output selection circuit SEL selects the internal digital signals dbO—dbi or dcO—dci supplied from the corresponding rate changing filter FIRB or FIRC respectively and transmits them to the output register REG as the digital signals dO—di.

The output register REG includes latches of (i+1) bits disposed in correspondence with the digital signals dO—di. These latches are supplied with the sampling clock signal $\phi s$ in common from the digital signal processor DSP.

The output register REG accepts and holds, i.e., stores, the digital signal dO—di supplied from the output selection circuit SEL in accordance with the sampling clock signal $\phi s$. The output signals of the output register REG are supplied to the digital signal processor DSP as output digital signals DO—Di, which are subjected to a predetermined signal process. Thus, the predetermined digital signals transmitted as the input analog signals Ain are sampled as received data. As mentioned, the term analog signals is used herein to include digital and distorted digital signals. The received data items are supplied to a device succeeding the echo canceller, and they are also transmitted to the digital PLL circuit DPLL. Thus, the sampling clock signal $\phi s$ and the oversampling clock signal $\phi os$ are phase-locked with the received data.

The control circuit CTL is supplied with the oversampling clock signal $\phi os$ from the digital PLL circuit DPLL, and is also supplied with the phase control signals "lead" and "lag" therefrom. Of them, the phase control signal "lead" is usually held at a low level and is brought to a high level selectively when it has become necessary to advance the cycle of the transfer function, the integration phase of the rate changing filter 20, of the A/D converter ADC. Likewise, the phase control signal "lag" is usually held at the low level and is brought to the high level selectively when it has become necessary to retard cycle of the transfer function, the integration phase of the rate changing filter 20, of the A/D converter ADC.

The control circuit CTL forms the timing signals $\phi ra$ through $\phi rc$ at predetermined timings and brings the selected one of the selection control signals sa through sc to the high level in accordance with the phase control signals "lead" and "lag." Thus, a corresponding one of the rate changing filters FIRA through FIRC is selected as the typical rate changing filter Ftyp, and the remaining two are respectively selected as the rate changing filters Flead and Flag.

Figure 2:
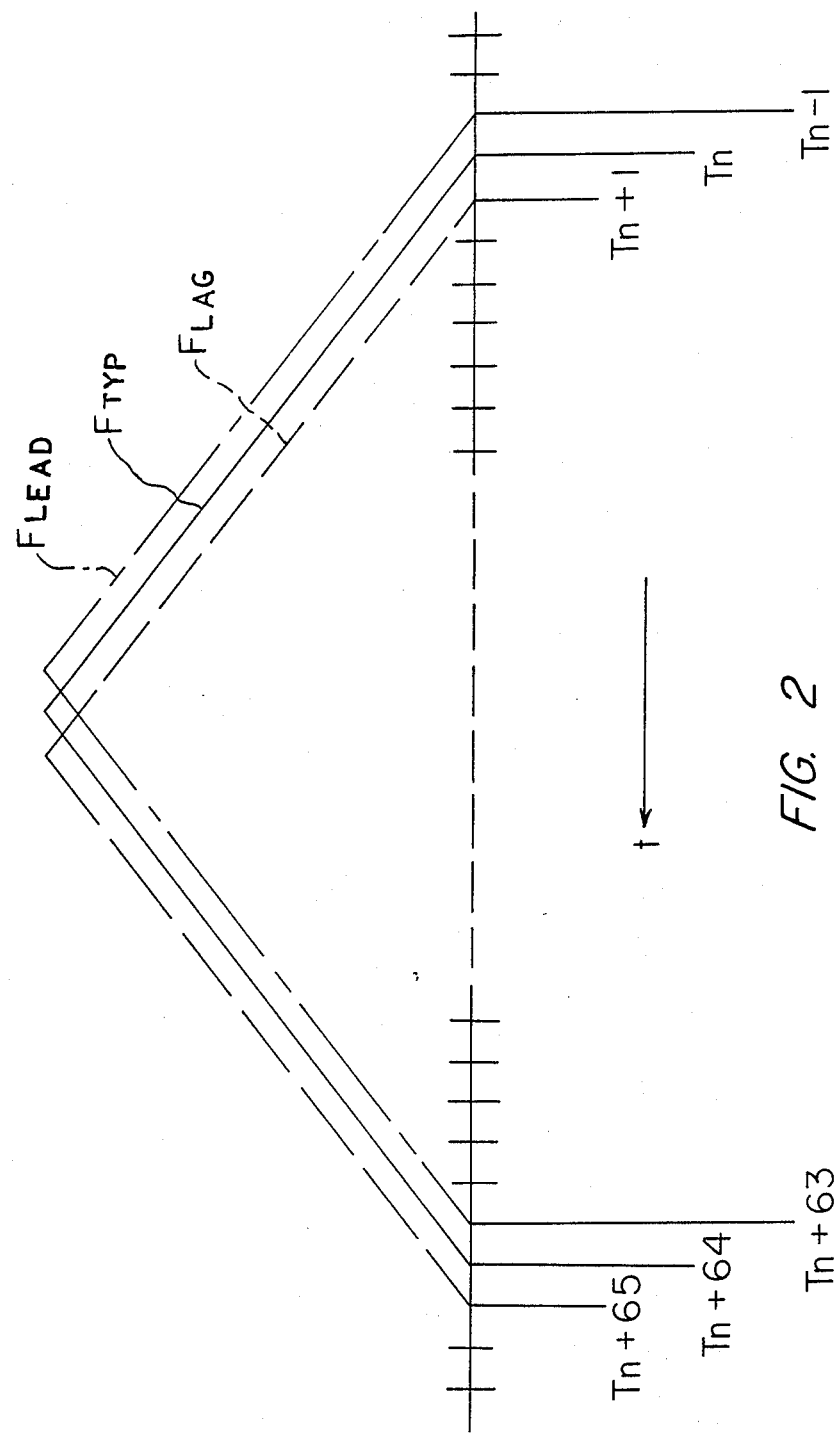
FIG. 2 is a characteristic diagram for explaining the relationships between the filter coefficients of the rate changing filters of the A/D converter in FIG. 1 and the period of time.

Shown in FIG. 2 is a characteristic diagram for explaining the relationships between the filter coefficients of the rate changing filters Ftyp, Flead and Flag and the period of time t. This filter coefficient is a sample of the type of transfer function employable with the present invention. In the figure, the axis of abscissas represents the period of time t, between clock pulses of $\phi s$, while the axis of ordinates represents the filter coefficients of the rate changing filters FIRA through FIRC. That is, FIG. 2 represents the transfer functions of FIRA–FIRC for one cycle T. By the way, the period of time t is divided into a plurality of divisions with the cycle of the oversampling clock signal $\phi os$ as one unit, that is 64 pulses of clock signal $\phi os$ equal one unit and occur for each pulse of clock signal $\phi s$. Referring to FIG. 2, the integration phase of the rate changing filter Ftyp has its start point at a time Tn, at which the rate changing filter selected as the rate changing filter Ftyp is supplied with the corresponding timing signal $\phi ra$, $\phi rb$ or $\phi rc$. As illustrated in FIG. 2, the transfer function, specifically the filter coefficient of this rate changing filter (all the filters have the same transfer function) is rectilinearly increased with the lapse of the period of time t and is maximized at the middle point between the time Tn and a time Tn+64. Thereafter, the filter coefficient is rectilinearly decreased with the lapse of the period of time t and is minimized at the time Tn+64.

The integration phase of the rate changing filter Flead or Flag has its start point changed or set at a time Tn−1 or Tn+1, respectively, at which time the rate changing filter set as the rate changing filter Flead or Flag is supplied with the corresponding timing signal $\phi ra$, $\phi rb$ or $\phi rc$. The filter coefficient of the rate changing filter selected as the rate changing filter Flead or Flag is rectilinearly increased with the lapse of the period of time t and is maximized at the middle point between the time Tn−1 or Tn−1 and a time Tn+63 or Tn+65.

In this embodiment, when the rate changing filter FIRA is selected (its phase is not changed) as the rate changing filter Ftyp, by way of example, it is stable with respect to integration and phase lock. At about the same time, the rate changing filter FIRC is automatically set as the rate changing filter Flead that is, its phase may be changed and therefore for the first part of the time t it is unstable as to integration and phase lock. Similarly to FIRC, at about the same time, the rate changing filter FIRB is set as the rate changing filter Flag and therefore it may briefly become unstable as to integration and phase lock.

Similarly, when one of the rate changing filters FIRB or FIRC is selected as the rate changing filter Ftyp at a later cycle time t, by way of example, FIRB and FIRC have by such time become stable as to integration and phase lock. At about the same time the rate changing filter FIRA or FIRB is automatically set as the rate changing filter Flead, and the rate changing filter FIRB or FIRA set as the rate changing filter Flag. When any of the rate changing filters FIRA through FIRC is selected as the rate changing filter Ftyp, the corresponding one of the selection control signals sa through sc is set at the high level. While the Flead and Flag differ in timing from Ftyp by one clock pulse of $\phi os$, other timing may be used but an integer multiple equal to or greater than one is preferred.

Figure 3:
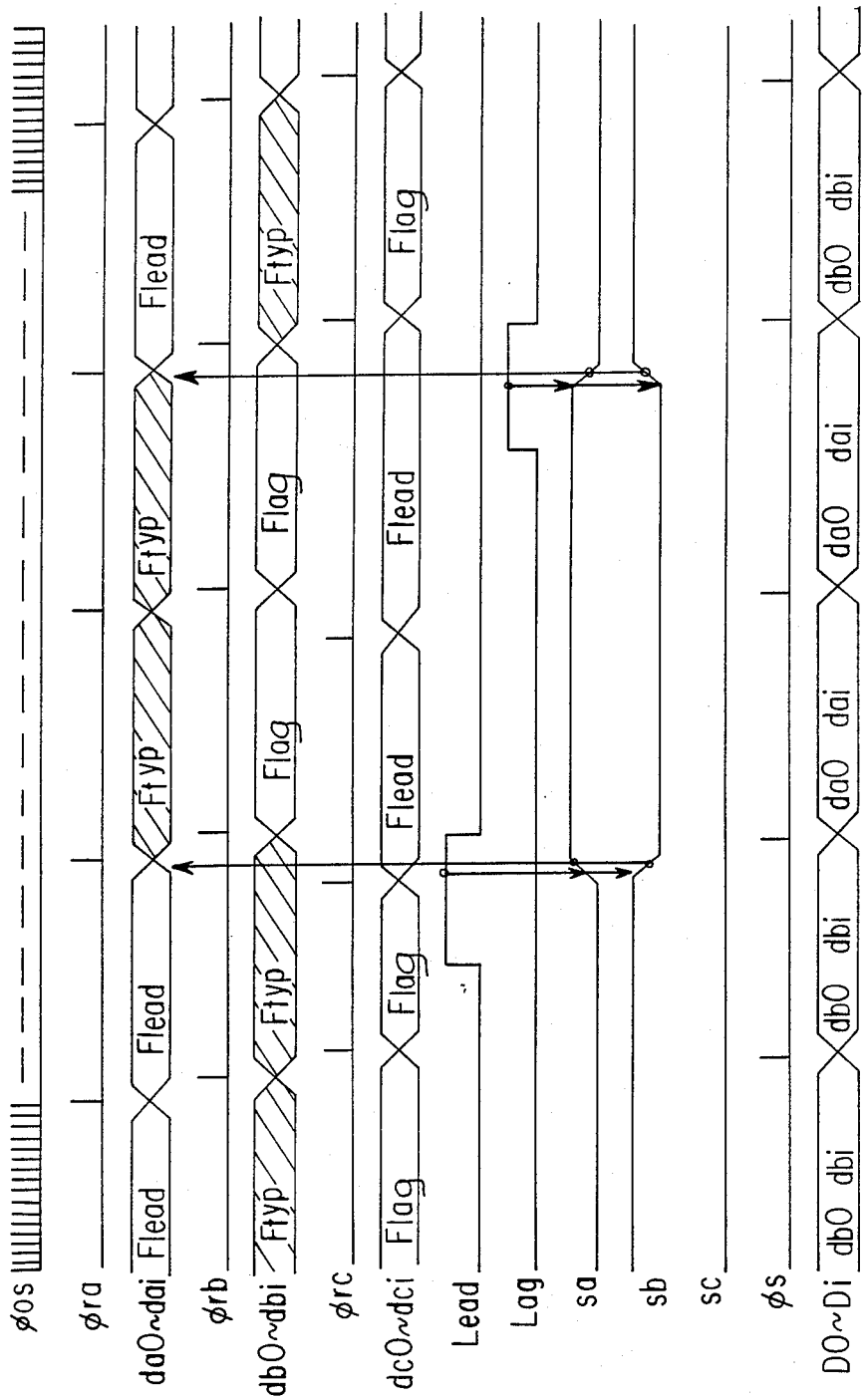
FIG. 3 is a timing chart showing an example of the phase control operation of the A/D converter in FIG. 1.

FIG. 3 is a timing chart of an example of the A/D converter ADC in FIG. 1. The phase control operation of the A/D converter ADC in this example will be outlined with reference to FIG. 3.

Referring to FIG. 3, the oversampling clock signal φos is set at, for example, 5.12 MHz as stated before, and the operation of sampling the input analog signal Ain by the oversampling A/D conversion circuit A/D is performed in synchronism with this oversampling clock signal φos.

In the timing chart of this example, at first, the rate changing filter FIRB (now stable) is selected as the typical rate changing filter Ftyp, and the selection control signal sb is selectively brought to the high level. Therefore, the stable signals from FIRB are sent to REG. On this occasion, the rate changing filter FIRA is set (that is its phase is changed so that it is now unstable) as the rate changing filter Flead, and the rate changing filter FIRC is set (that is its phase is changed so that it is now unstable) as the rate changing filter Flag. Regarding the timing signals φra through φrc, the timing signal φrb is preceded by the timing signal φra for one cycle of the oversampling clock signal φos and is succeeded by the timing signal φrc for one cycle of the oversampling clock signal φos. In this way, the integration phase of the rate changing filter FIRA is advanced for one cycle of the oversampling clock signal φos when compared with that of the rate changing filter FIRB. Besides, the integration phase of the rate changing filter FIRC is retarded for one cycle of the oversampling clock signal φos when compared with that of the rate changing filter FIRB. For the output selection circuit SEL of the A/D converter ADC, the selection control sb is selectively set at the high level as determined by the DPLL, whereby the output signals (previously having had time to become stable) of the rate changing filter FIRB, namely, the internal digital signals dbO—dbi are selected and transmitted to the output register REG. In accordance with the sampling clock signal φs, which is formed immediately after the timing signal φrb, the output register REG accepts the internal digital signals dbO—dbi and transmits them to the digital signal processor DSP as the output digital signals DO—Di. Here, the center frequencies of the sampling clock signal φs and the timing signals φra through φrc are set at 1/64 of the frequency of the oversampling clock signal φos, namely, at 80 kHz by way of example.

When supplied with the phase control signal "lead" from the digital PLL circuit DPLL, as shown by signal "lead" going high in FIG. 3, the control circuit CTL of the A/D converter ADC selects as the rate changing filter Ftyp the rate changing filter that is currently leading, that is FIRA, which has been operating with the integration phase leading for one cycle (64 pulses) of the oversampling clock signal φos till then so that it is now stable with respect to integration and phase lock, because one cycle is chosen to be long enough to stabilize the filter. On this occasion, the rate changing filter FIRC is set (that is changed in phase and becomes unstable temporarily) as the rate changing filter Flead, and the rate changing filter FIRB is set (that is changed in phase and becomes temporarily unstable) as the rate changing filter Flag. For this reason, the timing signal φrc is first formed, whereupon the timing signal φra and φrb are successively formed. Besides, as soon as the timing signal φra is formed, the selection control signal sb is brought to a low level, and the selection control signal sa is brought to the high level instead. For the output selection circuit SEL of the A/D converter ADC, the selection control signal sa is selectively set at the high level, whereby the output signals of the stable rate changing filter FIRA, namely, the internal digital signals daO—dai are selected and are transmitted to the output register REG. In accordance with the sampling clock signal φs formed immediately after the timing signal φra, the output register REG accepts the internal digital signals daO—dai and transmits them to the digital signal processor DSP as the output digital signals DO—Di.

Subsequently, when supplied with the phase control signal "lag" from the digital PLL circuit DPLL as shown by the signal "lag" going high in FIG. 3, the control circuit CTL of the A/D converter ADC selects as the rate changing filter Ftyp the rate changing filter FIRB, which has been operating with the integration phase lagging for one cycle (long enough to be stable) of the oversampling clock signal φos relative to that of the rate changing filter FIRA. On this occasion, the rate changing filter FIRA is set as the rate changing filter Flead, and the rate changing filter FIRC is set as the rate changing filter Flag. For this reason, the timing signal φra is first formed, whereupon the timing signals φrb and φrc are successively formed. Besides, as soon as the timing signal φrb is formed, the selection control signal sa is brought to the low level, and the selection control signal sb is brought to the high level instead. For the output selection circuit SEL of the A/D converter ADC, the selection control signal sb is selectively set at the high level, whereby the output signals of the stable rate changing filter FIRB. namely, the internal digital signals dbO—dbi are selected and transmitted to the output register REG. In accordance with the sampling clock signal φs which is formed immediately after the timing signal φrb, the output register REG accepts the internal digital signals dbO—dbi and transmits them to the digital signal processor DSP as the output digital signals DO—Di. Here, the center frequencies of the sampling clock signal φs and the timing signals φra through φrc are set at 1/64 of the frequency of the oversampling clock signal φos, namely, at 80 kHz by way of example.

When supplied with the phase control signal "lead" from the digital PLL circuit DPLL, as shown by signal "lead" going high in FIG. 3, the control circuit CTL of the A/D converter ADC selects as the rate changing filter Ftyp the rate changing filter that is currently leading, that is FIRA, which has been operating with the integration phase leading for one cycle of the oversampling clock signal φos so that it is now stable with respect to integration and phase lock because one cycle is chosen to be long enough to stabilize the filter. On this occasion, the rate changing filter FIRC is set (that is changed in phase and becomes unstable temporarily) as the rate changing filter Flead, and the rate changing filter FIRB is set (that is changed in phase and becomes temporarily unstable) as the rate changing filter Flag. For this reason, the timing signal φrc is first formed, whereupon the timing signals φra and φrb are successively formed. Besides, as soon as the timing signal φra is formed, the selection control signal sb is brought to a low level, and the selection control signal sa is brought to the high level instead. For the output selection circuit SEL of the A/D converter ADC, the selection control signal sa is selectively set at the high level, whereby the output signals of the stable rate changing filter FIRA, namely, the internal digital signals da0—dai are selected and are transmitted to the output register REG. In accordance with the sampling clock signal Os formed immediately after the reset signal Ora, the output register REG accepts the internal digital signals da0—dai and transmits them to the digital signal processor DSP as the output digital signals D0—Di.

Subsequently, when supplied with the phase control signal "lag" from the digital PLL circuit DPLL as shown by the signal "lag" going high in FIG. 3, the control circuit CTL of the A/D converter ADC selects as the rate changing filter Ftyp the rate changing filter FIRB, which has been operating with the integration phase lagging for one cycle (long enough to be stable) of the oversampling clock signal $\phi$os relative to that of the rate changing filter FIRA. On this occasion, the rate changing filter FIRA is set as the rate changing filter Flead, and the rate changing filter FIRC is set as the rate changing filter Flag. For this reason, the timing signal $\phi$ra is first formed, whereupon the timing signals $\phi$rb and $\phi$rc are successively formed. Besides, as soon as the timing signal $\phi$rb is formed, the selection control signal sa is brought to the low level, and the selection control signal sb is brought to the high level instead. For the output selection circuit SEL of the A/D converter ADC, the selection control signal sb is selectively set at the high level, whereby the output signals of the stable rate changing filter FIRB, namely, the internal digital signals db0—dbi are selected and transmitted to the output register REG. In accordance with the sampling clock signal $\phi$s formed immediately after the timing signal $\phi$rb, the output register REG accepts the internal digital signals db0—dbi and transmits them to the digital signal processor DSP as the output digital signals D0—Di.

Thenceforth, in the A/D converter ADC, similar phase control operations are performed on the basis of the supply of the phase control signal "lead" of "lag" from the digital PLL circuit DPLL, with the result that the phase of the output digital signals D0—Di to be transmitted to the digital signal processor DSP is controlled with one cycle of the oversampling clock signal $\phi$os as the unit.

As thus far described, the A/D converter ADC of this embodiment is furnished with the single oversampling A/D conversion circuit A/D, which receives the input analog signal Ain, and the three rate changing filters FIRA through FIRC receive the output signals of the oversampling A/D conversion circuit A/D in common. The internal digital signals da0—dai through dc0—dci output from these rate changing filters are selectively transmitted to the digital signal processor DSP by the output selection circuit SEL in accordance with the phase control signals "lead" and "lag" supplied from the digital PLL circuit DPLL. On this occasion, the rate changing filter whose output signals are selectively transmitted is set as the typical rate changing filter Ftyp. In addition, each of the remaining two rate changing filters is set as the rate changing filter Flead or Flag whose integration phase is advanced or retarded for one cycle of the oversampling clock signal $\phi$os, and which may later selectively be chosen as the rate changing filter Ftyp according to the phase control signal "lead" or "lag", being subsequently brought to the high level. Owing to these facts, the A/D converter ADC of this embodiment can, in effect, control the integration phase of the rate changing filter with one cycle of the oversampling clock signal $\phi$os as a unit and can realize a fine phase control. As a result, the transmission performance of a subscriber-line transmission equipment in an integrated digital communications network including the A/D converter ADC can be ensured.

Figure 4:
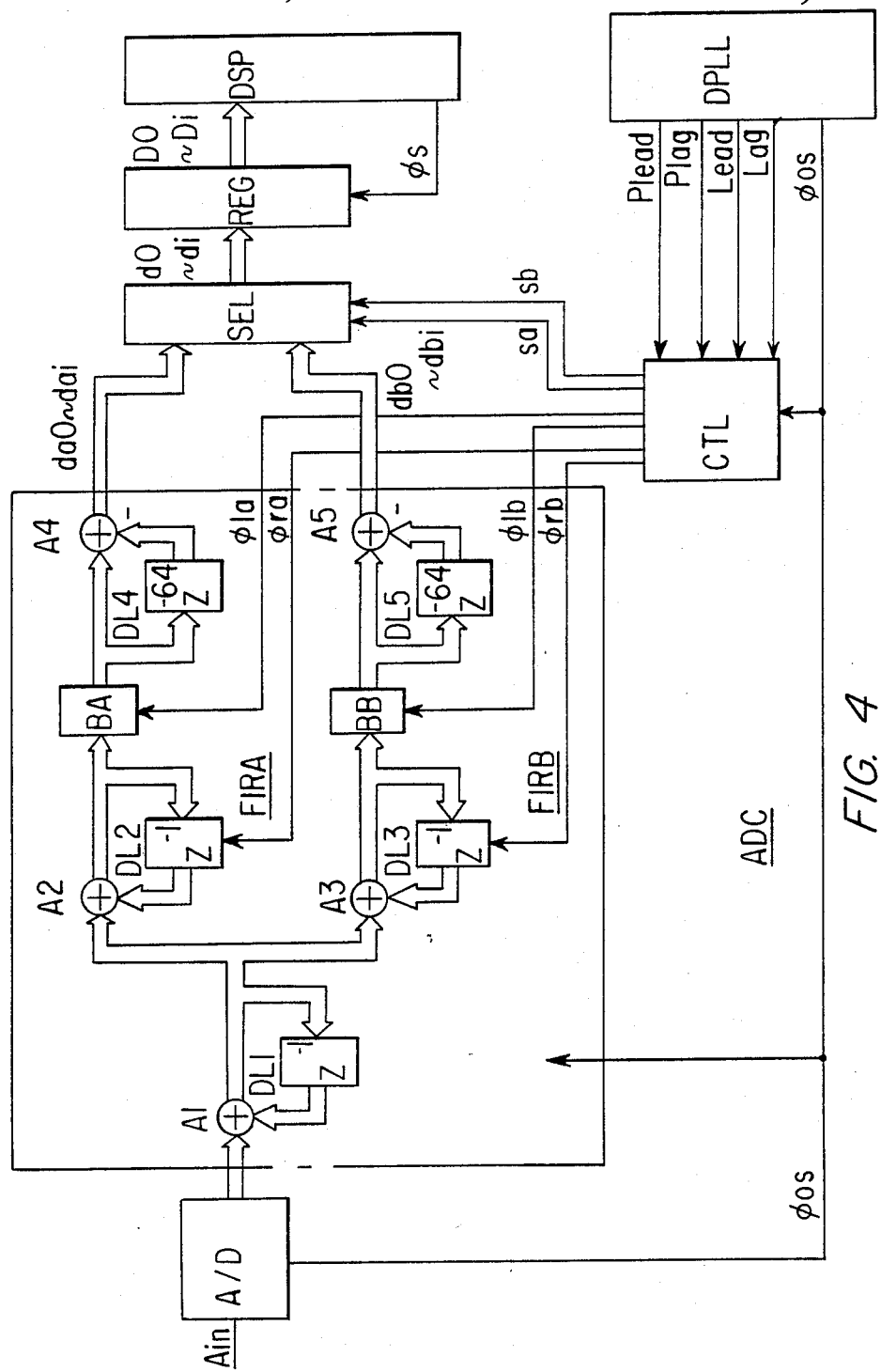
FIG. 4 is a circuit block diagram showing another embodiment of the A/D converter to which this invention is applied.

FIG. 4 is a circuit block diagram of another embodiment of the A/D converter ADC to which this invention is applied. In the figure, an oversampling A/D conversion circuit A/D and an output register REG correspond directly to the oversampling A/D conversion circuit A/D and the output register REG in FIG. 1, respectively. Besides, an output selection circuit SEL and a control circuit CTL have arrangements substantially similar to those of the output selection circuit SEL and the control circuit CTL in FIG. 1, respectively. Now, only portions which differ from the constituents of the embodiment in FIG. 1 will be supplementarily described.

The A/D converter ADC of this embodiment is furnished with two rate changing filters FIRA and FIRB, and although not especially restricted, these rate changing filters have their parts shared, whereby circuitry is further simplified. In this embodiment, a digital PLL circuit DPLL supplies the control circuit CTL of the A/D converter ADC with phase control preannouncement signals Plead and Plag in addition to phase control signals "lead" and "lag." Although no special restriction is meant, the phase control preannouncement signals are formed of the outputs of loop filters disposed in the digital PLL circuit DPLL and are selectively brought to a high level prior to the respectively corresponding phase control signals "lead" and "lag." The output signals of the rate changing filters FIRA and FIRB are selectively transmitted to a digital signal processor DSP by the control circuit CTL in such a way that selection control signals sa and sb are alternatively brought to a high level. On this occasion, the rate changing filter whose output signals are selected as a typical rate changing filter Ftyp, and the remaining one is selectively set as a rate changing filter Flead or Flag in accordance with the phase control preannouncement signal Plead or Plag. Thus, notwithstanding that the A/D converter ADC of this embodiment is provided with only the two rate changing filters, the integration phase of the rate changing filter is, in effect, controlled with one cycle of an oversampling clock signal $\phi$os as a unit, similarly to the embodiment in FIG. 1.

Referring to FIG. 4, the output signals of the oversampling A/D conversion circuit A/D are supplied to the one input terminal of an adder A1. The other input terminal of the adder A1 is supplied with the output signal of a delay unit DL1. The output signal of the adder A1 are supplied to one of the input terminals of each of adders A2 and A3 and are also supplied to the input terminals of the delay unit DL1. Thus, the adder A1 and the delay unit DL1 constitute one integration circuit.

The other input terminals of the adders A2 and A3 are supplied with the output signals of corresponding delay units DL2, DL3. The output signals of the adder A2, A3 are supplied to the input terminals of corresponding buffers BA, BB and ar also supplied to the input terminals of the corresponding delay units DL2, DL3. Thus, each of the pair of the adder A2 and the delay unit DL2 and the pair of the adder A3 and the delay unit DL3 are constructed as one integration circuit. The delay units DL2, DL3 have the integrating register thereof cleared in accordance with a corresponding timing signal $\phi$ra or $\phi$rb supplied from the control circuit CTL, thereby to be selectively brought into a reset state. The latchs BA, BB are triggered in accordance with a corresponding latch signal $\phi$la or $\phi$lb supplied from the control circuit CTL, thereby to accept and hold the output signals of the corresponding adder A2 or A3.

The output signals of the latches BA or BB are supplied to one of the input terminals of corresponding adders A4, A5, and are also supplied to the input terminals of corresponding delay units DL4, DL5. The output signals of the delay units DL4, DL5 are supplied to the other input terminals of the corresponding adders A4, A5. Thus, each of the pair of the adder A4 and the delay unit DL4 and the pair of the adder A5 and the delay unit DL5 constructs one differentiation circuit.

Owing to these facts, the integration circuit configured of the adder A1 and the delay unit DL1, the other integration circuit configured of the adder A2 and the delay unit DL2, the buffer BA, and the differentiation circuit configured of the adder A4 and the delay unit DL4, constitute the first rate changing filter FIRA. Likewise, the integration circuit configured of the adder A1 and the delay unit DL1, the other integration circuit configured of the adder A3 and the delay unit DL3, the latch BB, and the differentiation circuit configured of the adder A5 and the delay unit DL5, constitute the second rate changing filter FIRB. That is, in this embodiment, the integration circuit configured of the adder A1 and the delay unit DL1 is shared by the rate changing filters FIRA and FIRB, so that the circuitry can be simplified. In addition, likewise to the rate changing filters FIRA through FIRC of the foregoing embodiment in FIG. 1, these rate changing filters FIRA and FIRB come to have transfer characteristics that realize the following transfer function Fs:

$$Fs = [(1-Z^{-n})/(1-Z^{-1})]^2$$

The output signals of the adder A4, namely, the output signals of the rate changing filter FIRA, in other words, internal digital signals daO—dai are supplied to the corresponding one of the input terminals of the output selection circuit SEL. Similarly, the output signals of the adder A5, namely, the output signals of the rate changing filter FIRB, in other words, internal digital signals dbO—dbi are supplied to the corresponding other of the input terminals of the output selection circuit SEL. The output selection circuit SEL is further supplied with the selection control signals sa and sb from the control circuit CTL. These selection control signals sa and sb are brought to the high level alternatively.

In accordance with the selection control signals sa and sb, the output selection circuit SEL selects one of the internal digital signals daO—dai or dbO—dbi to be delivered as the outputs from the rate changing filter FIRA or FIRB and transmits the selected one to the output register REG.

The control circuit CTL is supplied with the oversampling clock signal $\phi$os and also the phase control signals "lead" and "lag" from the digital PLL circuit DP11. As stated before, the control circuit CTL is supplied with the phase control preannouncement signals Plead and Plag formed of the outputs of the loop filters of the digital PLL circuit DPLL. The phase control preannouncement signals Plead and Plag are brought to the high level, at least, one cycle of a sampling clock signal $\phi$s before the respectively corresponding phase control signals "lead" and "lag" are set at a high level.

That is, the phase control signal "lead" is set at the high level on the premise that the phase control preannouncement signal Plead is at the high level, while the phase control signal "lag" is set at the high level on the premise that the phase control preannouncement signal Plag is at the high level.

The control circuit CTL forms the timing signals $\phi$ra and $\phi$rb, latch signals $\phi$la and $\phi$lb and selection control signals sa and sb selectively in accordance with predetermined conditions, on the basis of the oversampling clock signal $\phi$os, phase control signals "lead" and "lag" and phase control preannouncement signals Plead and Plag.

Figure 5:
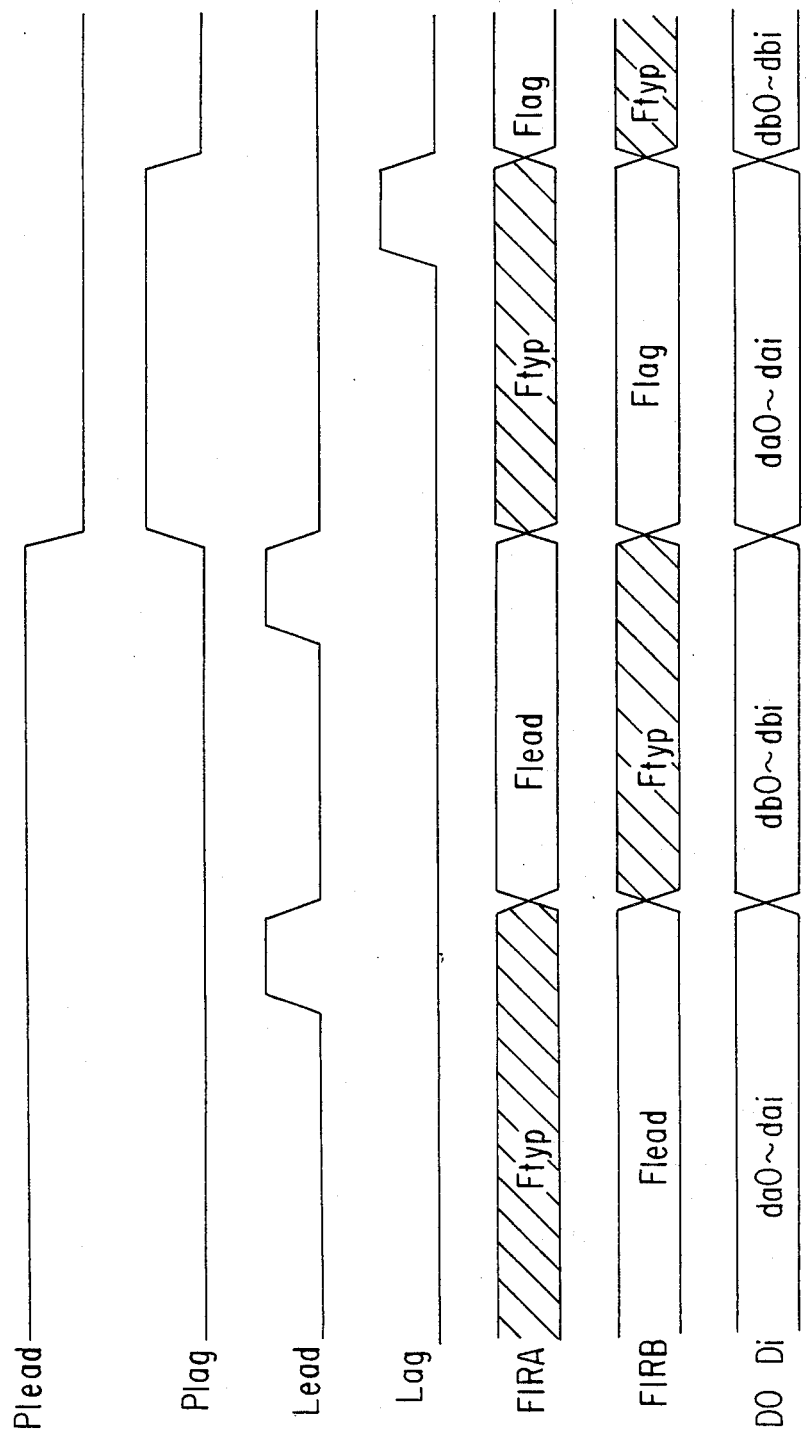
FIG. 5 is a timing chart showing an example of the phase control operation of the A/D converter in FIG. 4.
Figure 6:
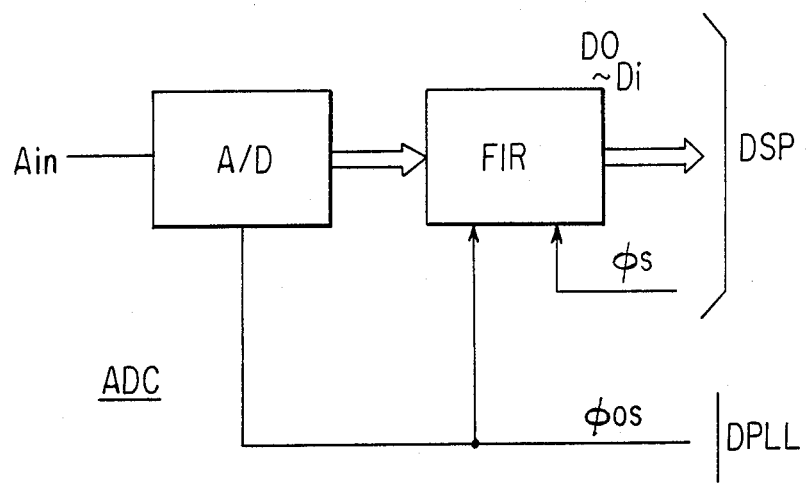
FIG. 6 is a block diagram showing an example of a prior-art A/D converter useful in explaining part of the present invention.
Figure 7:
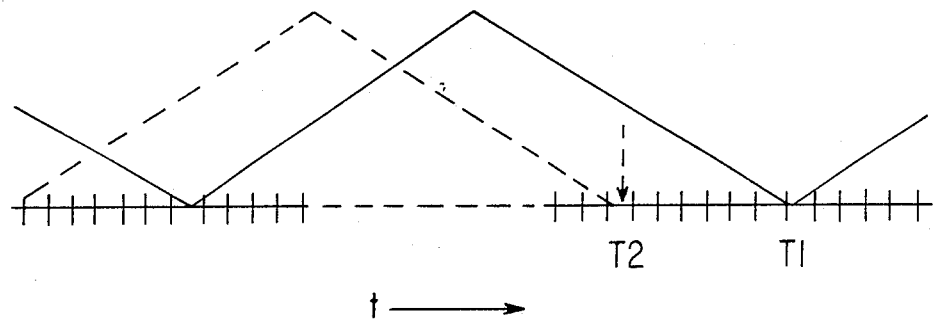
FIG. 7 is a characteristic diagram for explaining the relationship between the filter coefficient of the rate changing filter FIG. 6 and the period of time.

In FIG. 5 is a timing chart of an example of the A/D converter AD in FIG. 4. The phase control operation of the A/D converter ADC in this example will be outlined with reference to FIG. 5.

Referring to FIG. 5, in the A/D converter ADC, the rate changing filter FIRA is first selected as the typical rate changing filter Ftyp. On the other hand, the rate changing filter FIRB is set as the rate changing filter Flead because of the phase control preannouncement signal Plead at the high level, and the integration phase of FIRB is advanced for one cycle of the oversampling clock signal $\phi$os when compared with that of the rate changing filter FIRA. Therefore the integration and phase of rate changing filter FIRB have a chance to stabilize while filter FIRA is Ftyp. On this occasion, the selection control signal sa is set at the high level, and the output selection circuit SEL selects the output signals of the rate changing filter FIRA, namely, the internal digital signals daO—dai and transmits them to the output register REG. The internal digital signals daO—dai are transmitted to the digital signal processor DSP at a succeeding stage as output digital signals DO—Di.

Subsequently when the phase control signal "lead" is temporarily set at the high level, the control circuit CTL of the A/D converter ADC brings the selection control signal sa to a low level and brings the selection control signal sb to the high level instead. Since the control circuit CTL is still supplied with the phase control preannouncement signal Plead of the high level from the digital PLL circuit DPLL it advances the timing signal $\phi$ra and latch signal $\phi$la, not shown, for one cycle of the oversampling clock signal $\phi$os relative to the reset signal $\phi$rb and latch signal $\phi$lb. In consequence, the now stable rate changing filter FIRB is selected as the typical rate changing filter Ftyp, and the output signals thereof, namely, the internal digital signals dbO—dbi are transmitted to the output register REG through the output selection circuit SEL. On this occasion, the rate changing filter FIRA is set as the rate changing filter Flead, and the integration phase thereof is further advanced for one cycle of the oversampling clock signal $\phi$os relative to that of the rate changing filter FIRB. Therefore, the rate changing filter FIRA has time to stabilize integration and phase while rate changing filter FIRB is Ftype.

Subsequently, when the phase control signal "lead" is temporarily rendered at the high level again, the control circuit CTL of the A/D converter ADC selects the now stable rate changing filter FIRA as the typical rate changing filter Ftyp owing to an operation similar to the above, to transmit the internal digital signals daO—dai to the digital signal processor DSP through the output selection circuit SEL as well as the output register REG. As a result, an excessive phase lead is detected in the digital PLL circuit DPLL, whereupon the phase control preannouncement signal Plag is brought to the high level. In the A/D converter ADC, therefore, the rate changing filter FIRB is set as the rate changing filter FLag, and the integration phase thereof is retarded for one cycle of the oversampling clock signal φos relative to that of the rate changing filter FIRA. Therefore the rate changing filter FIRB has time to stabilize integration and phase while rate changing filter FIRA is Ftyp.

Subsequently, when the phase control signal "lag" is temporarily rendered at the high level, the control circuit CTL of the A/D converter ADC brings the selection control signal sb to the high level and selects the now stable rate changing filter FIRB as the typical rate changing filter Ftyp. Thus, the output signals of the rate changing filter FIRB, namely, the internal digital signals db0−dbi are transmitted to the digital signal processor DSP through the output selection circuit SEL as well as the output register REG. In the digital PLL circuit DPLL, the agreement between the phases of the received data and the sampling clock signal φs or the like is detected, and both the phase control preannouncement signals Plead and Plag are brought to a low level. Although no special restriction is meant, the A/D converter ADC holds the last state when both the phase control preannouncement signals Plead and Plag are set at the low level. Therefore, the rate changing filter FIRA is left intact as the rate changing filter Flag.

As thus far described, the A/D converter ADC of this embodiment is furnished with the two rat changing filters FIRA and FIRB, and these rate changing filters have their parts shared, whereby the circuitry can be further simplified. The control circuit CTL is supplied with the phase control preannouncement signals Plead and Plag besides the phase control signals "lead" and "lag" from the digital PLL circuit DPLL. Of the two rate changing filters FIRA and FIRB, one is selected as the typical rate changing filter Ftyp selectively in accordance with the phase control signals "lead" and "lag", and the other is set as the rate changing filter FLead or Flag selectively in accordance with the phase control preannouncement signals. With the A/D converter ADC of this embodiment, therefore, notwithstanding that only the two rate changing filters are disposed, the integration phase of the rate changing filter is permitted to be controlled with one cycle of the oversampling clock signal φos as a unit, similarly to the embodiment in FIG. 1. Thus, while the simplification of the circuitry of the A/D converter ADC is achieved, the jitters of a digital communications network including the A/D converter ADC can be reduced, and the transmission performance thereof can be enhanced.

As indicated by the two embodiments described above, when this invention is applied to an A/D converter included in the subscriber-line transmission equipment of an integrated digital communications network, or the like, the following functional effects are attained:

(1) An A/D converter is furnished with a plurality of transfer function devices, which receive the output signals of an oversampling A/D conversion circuit in common and the transfer function phase o: at least one is selectively advanced or retarded for a predetermined interval during disuse so that it will stabilize for later use, and an output selection circuit selectively transmits digital signals delivered as outputs from another of the transfer function devices whose phase is not changed, thereby to bring forth the effect that the phase of the device as a whole of the A/D converter can be controlled with the predetermined interval as a unit in a stable manner.

(2) In the above item (1), the A/D converter is furnished with the two devices, one of which has its output signals validated selectively in accordance with phase control signals supplied from a digital PLL circuit and the other of which has its integration phase advanced or retarded selectively in accordance with phase control preannouncement signals supplied from the digital PLL circuit, thereby to bring forth the effect that, while the circuitry of the A/D converter is simplified, the phase of the device as a whole can be controlled in a stable manner.

(3) Owing to the above items (1) and (2), there is brought forth the effect that the transmission performance of a subscriber-line transmission equipment including the A/D converter can be ensured.

(4) In the above items (1) and (2), the digital PLL circuit is constructed in the form in which a phase control by the A/D converter is included, thereby to bring forth the effect that a counter circuit, etc. to be provided in the digital PLL circuit can be dispensed with to simplify a subscriber-line transmission equipment.

Although, in the above, the invention has been concretely described on the basis of embodiments, it is needless to say that this invention is not restricted to the foregoing embodiments, but that it can be variously altered within a scope not departing from the purport thereof. By way of example, in the embodiments in FIGS. 1 and 4, each of the rate changing filters is endowed with the transfer function:

$$Fs = [(1-Z^{-n})/(1-Z^{-1})]^2$$

However, it may well have the following transfer function:

$$Fs = [(1-Z^{-n})/(1-Z^{-1})]$$

Besides, in each of the embodiments, the oversampling A/D conversion circuit A/D may well be of any type other than the Delta summation type, and the oversampling clock signal φos and the sampling clock signal φs can have any desired frequencies provided the oversampling frequency is higher than the sampling frequency as dictated by their definitions. Regarding the digital signal processor DSP disposed at the stage succeeding the A/D converter ADC, similar functions may well be realized by hardware.

In the embodiment of FIG. 4, a similar A/D converter can be realized without employing the phase control preannouncement signals Plead and Plag, in case of a system in which an actual set control may well be retarded for several sampling cycles or so when the phase control signal "lead" or "lag" has been input. The control of an integration phase by the control circuit CTL may well be performed with, for example, a plurality of cycles of the oversampling clock signal φos as a unit. Further, various aspects of performance can be adopted for the block arrangements of the A/D converters ADC shown in FIGS. 1 and 4, the practicable circuit arrangements of the rate changing filters FIRA and FIRB shown in FIG. 4, the combinations of the various control signals, and so on.

Although, in the above, the invention has been chiefly described as to application to an A/D converter included in the subscriber-line transmission equipment of an integrated digital communications network as forms the background field of utilization thereof, it is not restricted thereto, but is also applicable to, for example, a modem and various similar transmission equipment including the oversampling A/D converters. The present invention is extensively applicable to an A/D converter that includes an oversampling A/D conversion circuit and rate changing filters, and a transmission equipment that includes such an A/D converter.

An effect attained by a typical one of the inventions disclosed in the present application is briefly explained as follows: An A/D converter is furnished with a plurality of rate changing filters to each receive the output signals of an oversampling A/D conversion circuit in common and the integration phases of which are selectively advanced or retarded for a predetermined preselection interval long enough to stabilize, and an output selection circuit that selectively transmits digital signals delivered as outputs from a stable one of the rate changing filters, whereby the integration phase of the rate changing filter of the A/D converter can be virtually controlled and be stable when used with the predetermined interval as a unit, so that the transmission performance of a subscriber-line transmission equipment or the like including the A/D converter can be secured.

Although the operation of the control circuit, CTO is apparent from the above description and therefrom a person skilled in the art could construct a truth table and sequential logic circuit, a specific example of the control circuit CTL will be set forth as follows with respect to the embodiment of FIG. 1, wherein there are three separate filters FIRA, FIRB and FIRC. As mentioned, only one of the three filters is set as Ftyp at any one time, therefore, there are three possibilities corresponding respectively to each of the three filters being Ftyp. As seen from FIG. 3, when FIRB is Ftyp, FIRA is Flead and FIRC is Flag, for the first cycle (from time zero to the first pulse of the sample clock $\phi s$). During the third cycle, for example, (between the second and third pulses of the sample clock), it is seen that FIRA is Ftyp, FIRB is Flag and FIRC is Flead. During some other cycle, not shown in FIG. 3, it is clear that FIRC would be Ftyp, and one of FIRA and FIRB would be Flead while the other would be Flag. As seen from FIG. 3 in the above description, it is clear that sb will be high while sa and sc are low when FIRB is Ftyp; sa will be high while sb and sc are low when FIRC is Ftyp; and sc will be high while sa and sb are low when FIRC is Ftyp.

When FIRC is Ftyp, it really doesn't make any difference which one of FIRA and FIRB is Flead so long as the other is Flag in accordance with the above discussion. For purposes of a specific example, FIRA will be chosen as Flag and FIRB will be set as Flead, when FIRC is selected as Ftyp. It is clear that from the above that we have now completely defined a specific example of the three possible states. As is well know in digital logic, three states may be defined with a code of two bits, for example S1 and S2, in summary the three states are set forth below in Table A.

TABLE A

| STATE | | CLOCK GEN | | | DECODER | | |
|---|---|---|---|---|---|---|---|
| S1 | S2 | $\phi$ra | $\phi$rb | $\phi$rc | Sa | Sb | Sc |
| 0 | 0 | Flead | Ftyp | Flag | 0 | 1 | 0 |
| 0 | 1 | Ftyp | Flag | Flead | 1 | 0 | 0 |

TABLE A-continued

| STATE | | CLOCK GEN | | | DECODER | | |
|---|---|---|---|---|---|---|---|
| S1 | S2 | $\phi$ra | $\phi$rb | $\phi$rc | Sa | Sb | Sc |
| 1 | 0 | Flag | Flead | Ftyp | 0 | 0 | 1 |

As is well know with respect to digital logic, the foregoing defines specifically the truth table for the sequential logic provided by the control circuit CTL, which is set forth below in Table B.

TABLE B

| S1.n | S2.n | lead | lag | S1.n + 1 | S2.n + 1 |
|---|---|---|---|---|---|
| 0 | 0 | 0 | 0 | 0 | 0 |
| 0 | 0 | 0 | 1 | 1 | 0 |
| 0 | 0 | 1 | 0 | 0 | 1 |
| 0 | 0 | 1 | 1 | X | X |
| 0 | 1 | 0 | 0 | 0 | 1 |
| 0 | 1 | 0 | 1 | 0 | 0 |
| 0 | 1 | 1 | 0 | 1 | 0 |
| 0 | 1 | 1 | 1 | X | X |
| 1 | 0 | 0 | 0 | 1 | 0 |
| 1 | 0 | 0 | 1 | 0 | 1 |
| 1 | 0 | 1 | 0 | 0 | 0 |
| 1 | 0 | 1 | 1 | X | X |
| 1 | 1 | 0 | 0 | X | X |
| 1 | 1 | 0 | 1 | X | X |
| 1 | 1 | 1 | 0 | X | X |
| 1 | 1 | 1 | 1 | X | X |

In the preceding table, according to standard practice and the logic convention of high and low employed as seen in FIG. 3, zero indicates a low signal level, one indicates a high signal level, and X indicates a don't care situation.

Figure 8:
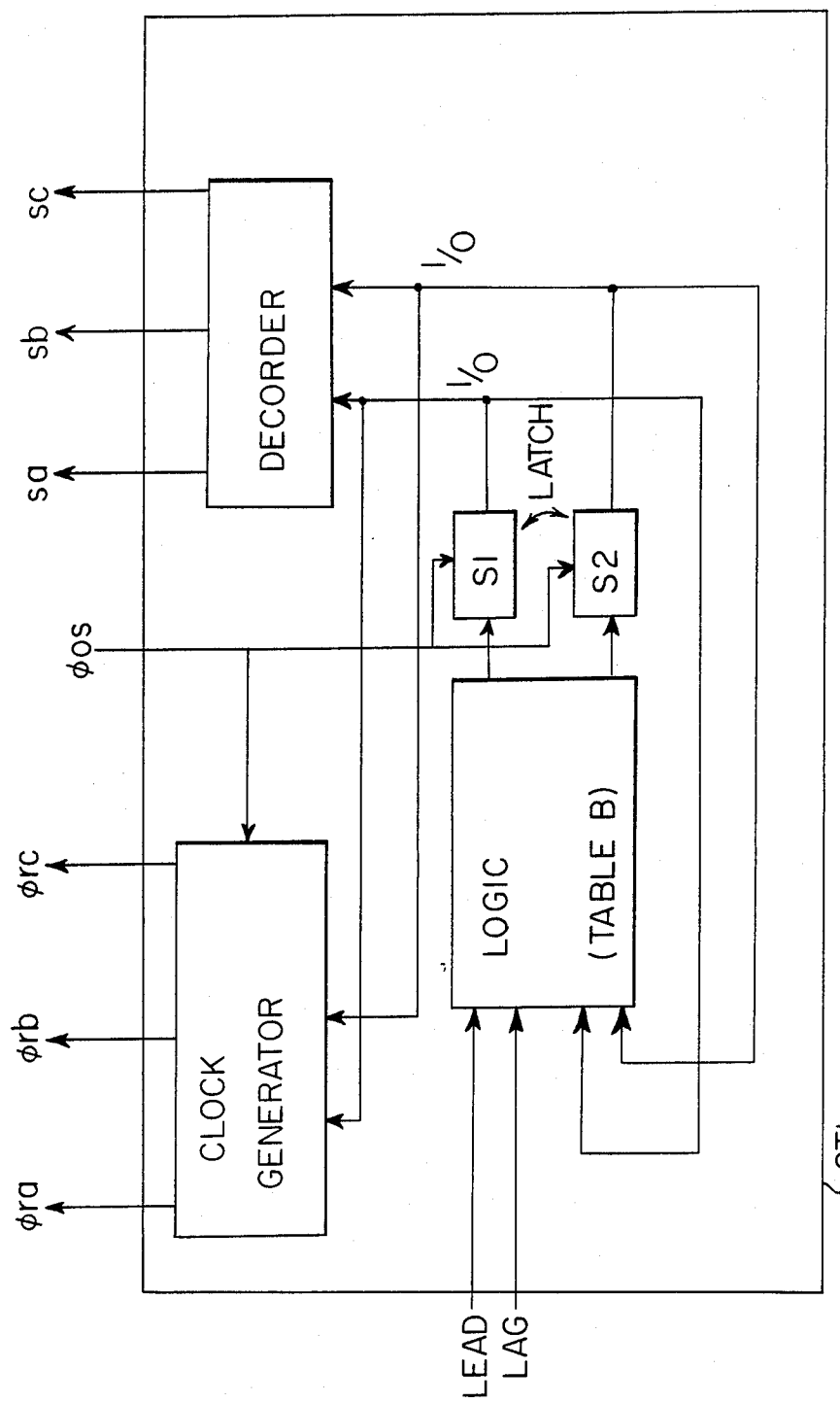
FIG. 8 shows more details of the controller.

While a person having ordinary skill in the art can easily construct the sequential logic circuit from the truth table set forth in Table B, the specific logic circuit would be quite detailed and serve no purpose. Therefore, a simplified version of such a logic circuit, in block form is shown in FIG. 8, wherein the specific logic circuit defined by Table B, in turn defined by FIG. 3, is shown as the block logic (Table B), having the outputs of the code bits S1 and S2 according to Table A, held respectively in latches labeled S1 and S2. Under the control of the clock signal $\phi$os, latches S1 and S2 output their values S1, S2 respectively to the DECODER, which decode bits S1 and S2 in accordance with Table A to produce the decoded outputs, sa, sb, sc. The logic code bits S1, S2 are also respectively sent to the clock generator along with the clock signal $\phi$os to generate the signals Ora, Orb, Orc in accordance with Table A.

While preferred embodiments along with variations and modifications have been set forth for disclosing the best mode and important details, further embodiments, variations and modifications are contemplated according to the broader aspects of the present invention, all as set forth in the spirit and scope of the following claims.

We claim:
1. A signal processing circuit, comprising:
   first signal processing means having a first transfer function variable with time over a fixed timed period of a first cycle and repeating at a first frequency;
   second signal processing means having a second transfer function variable with time over a second cycle equal in length of time to said first cycle and repeating at said frequency, said first transfer function being substantially equal to said second transfer function, and each transfer function being un- stable for an initial portion of a cycle when the phase of its frequency is changed;

input means for splitting an input into two substantially equal inputs and respectively feeding said two substantially equal inputs to said first and second signal processing means;

select means for receiving outputs from each of said signal processing means; said select means, in response to a control signal, outputting a selected one of said outputs from said signal processing means;

control means for providing said input control signal to said select means for selecting said first signal processing means without changing its phase and for changing the phase of said second signal processing means for at least one cycle; and thereafter, said control means, for a subsequent cycle, providing said control signal to said select means for selecting said second signal processing means without changing its phase and for changing the phase of said first signal processing means for at least one cycle.

2. A circuit according to claim 1, including said control means providing two clock signals out of phase with each other by a fixed amount and for respectively feeding said two clock signals to said first and second signal processing means;

each of said first and said second signal processing means repeating said cycle of said transfer function in phase with the phase of the received clock signal from said control means; and said control means providing said clock signals substantially of equal frequency.

3. A circuit according to claim 2, including A/D converter means for sampling an input at a frequency substantially greater than said first frequency and producing an output fed to the input of said input means for splitting.

4. A circuit according to claim 3, including phase lock loop means providing, selectively, lead and lag signals to said control means in response to said input; and said control means being responsive to said lead and lag signals for providing said control signal to said select means to select one of said signal processing means and further providing a set signal to the other of said signal processing means to set its phase relationship with respect to said one of said signal processing means.

5. A circuit according to claim 2, including phase lock loop means providing, selectively, lead and lag signals to said control means in response to said input; and said control means being responsive to said lead and lag signals for providing said control signal to said select means to select one of said signal processing means and further providing a set signal to the other of said signal processing means to set its phase relationship with respect to said one of said signal processing means.

6. A circuit according to claim 2, including a phase lock loop circuit; said control means being responsive to said phase lock loop circuit to provide a control signal to said select means for selecting one of said signal processing circuit means without changing its phase and further being responsive to said phase lock loop for changing the phase of the other of said signal processing circuit means at substantially the same time.

7. A circuit according to claim 3, including a phase lock loop circuit; said control means being responsive to said phase lock loop circuit to provide a control signal to said select means for selecting one of said signal processing circuit means without changing its phase and further being responsive to said phase lock loop for changing the phase of the other of said signal processing circuit means at substantially the same time.

8. A circuit according to claim 4, including a register means receiving and storing the output of said select means and providing an output clocked to said clock signal; and digital signal processing circuit means receiving the output from said register means and providing an output.

9. The signal processor circuit of claim 8, constructed entirely on a single integrated circuit chip.

10. A circuit according to claim 2, wherein there are only said two signal processing means; phase lock loop means selectively providing only one of prelead and prelag signals; said control means being responsive to said one of prelead and prelag signals, respectively, for selectively setting the unselected one of said signal processing means in a corresponding one of a leading phase relationship and a lagging phase relationship with respect to the selected signal processing means.

11. The signal processor circuit of claim 10, constructed entirely on a single integrated circuit chip.

12. A circuit according to claim 2, including third signal processing means substantially identical to said first and second signal processing circuit means;

phase lock loop means selectively providing one of a lead and lag signal to said control means:

said control means maintaining said first, second and third signal processing means in a relationship such that two of said signal processing means that are not selected by said select means are respectively in leading and lagging phase relationship with respect to the other of said signal processing means that is selected; and said control means, on a subsequent cycle, being responsive to the one of said lead and lag signals provided by said phase lock loop means for controlling said select means for selecting the corresponding one of the leading and lagging signal processing means that has stabilized over at least the previous cycle and for setting the remaining two unselected signal processing means in leading and lagging phase relationship, respectively, with respect to the frequency of the selected signal processing means.

13. The signal processor circuit of claim 12, constructed entirely on a single integrated circuit chip.

14. The circuit according to claim 3, wherein each of said signal processing means is an integration filter.

15. The circuit according to claim 14, wherein each of said integration filters is providing weighted integration variable according to a fixed relationship with respect to time over its cycle.

16. The circuit according to claim 4, wherein each of said signal processing means is an integration filter.

17. The circuit according to claim 16, wherein each of said integration filters is providing weighted integration variable according to a fixed relationship with respect to time over its cycle.

18. A modem including the circuit of claim 16.

19. An echo cancellor, including the circuit of claim 16.

20. A signal processing circuit, comprising:

first signal processing means having a transfer function variable with time over a fixed time period of a first cycle and repeating at a first frequency;

second signal processing means having a transfer function variable with time over a second cycle equal in length of time to said first cycle and repeating at said frequency, said first transfer function being substantially equal to said second transfer function;

input means for splitting an input into two substantially equal inputs and respectively feeding said two substantially equal inputs to said first and second signal processing means;

output means having a circuit output and receiving outputs from each of said signal processing means; and A/D converter means for sampling an input at a frequency substantially greater than said first frequency and producing an output fed to the input of said input means for splitting.

21. The circuit according to claim 20, wherein each of said signal processing means is an integration filter.

22. The circuit according to claim 21, wherein each of said integration filters is providing weighted integration variable according to a fixed relationship with respect to time over its cycle.

23. The signal processor circuit of claim 22, constructed entirely on a single integrated circuit chip.

24. A circuit according to claim 9, wherein said signal processing means have active circuit devices in common.

25. A signal processing circuit, comprising:

first signal processing means having a first transfer function variable with time over a fixed timed period of a first cycle and repeating at a first frequency;

second signal processing means having a second transfer function variable with time over a second cycle equal in length of time to said first cycle and repeating at said frequency out of phase with said first transfer function, said first transfer function being substantially equal to said second transfer function, and each transfer function being unstable for an initial portion of a cycle when the phase of its frequency is changed;

input means for splitting an input into two substantially equal inputs and respectively feeding said two substantially equal inputs to said first and second signal processing means;

select means for receiving outputs from each of said signal processing means; said select means, in response to a control signal, outputting a selected one of said outputs from said signal processing means;

control means for providing said input control signal to said select means for selecting said first signal processing means without changing its phase; and thereafter, said control means, for a subsequent immediately adjacent cycle, providing said control signal to said select means for selecting said second signal processing means without changing its phase.

26. A circuit according to claim 25, including said control means providing two clock signals out of phase with each other by a fixed amount and for respectively feeding said two clock signals to said first and second signal processing means;

each of said first and said second signal processing means repeating said cycle of said transfer function in phase with the phase of the received clock signal from said control means; and said control means providing said clock signals substantially of equal frequency.

27. A circuit according to claim 26, including A/D converter means for sampling an input at a frequency substantially greater than said first frequency and producing an output fed to the input of said input means for splitting.

28. A circuit according to claim 27, including phase lock loop means providing, selectively, lead and lag signals to said control means in response to said input; and said control means being responsive to said lead and lag signals for providing said control signal to said select means to select one of said signal processing means and further providing a set signal to the other of said signal processing means to set its phase relationship with respect to said one of said signal processing means.

29. A circuit according to claim 26, including phase lock loop means providing, selectively, lead and lag signals to said control means in response to said input; and said control means being responsive to said lead and lag signals for providing said control signal to said select means to select one of said signal processing means and further providing a set signal to the other of said signal processing means to set its phase relationship with respect to said one of said signal processing means.

30. A circuit according to claim 26, including a phase lock loop circuit; said control means being responsive to said phase lock loop circuit to provide a control signal to said select means for selecting one of said signal processing circuit means without changing its phase and further being responsive to said phase lock loop for changing the phase of the other of said signal processing circuit means at substantially the same time.

31. A circuit according to claim 27, including a phase lock loop circuit; said control means being responsive to said phase lock loop circuit to provide a control signal to said select means for selecting one of said signal processing circuit means without changing its phase and further being responsive to said phase lock loop for changing the phase of the other of said signal processing circuit means at substantially the same time.

32. A circuit according to claim 26, wherein there are only said two signal processing means; phase lock loop means selectively providing only one of prelead and prelag signals; said control means being responsive to said one of prelead and prelag signals, respectively, for selectively setting the unselected one of said signal processing means in a corresponding one of a leading phase relationship and a lagging phase relationship with respect to the selected signal processing means.

33. The signal processor circuit of claim 32, constructed entirely on a single integrated circuit chip.

34. A circuit according to claim 26, including third signal processing means substantially identical to said first and second signal processing circuit means;

phase lock loop means selectively providing one of a lead and lag signal to said control means;

said control means maintaining said first, second and third signal processing means in a relationship such that two of said signal processing means that are not selected by said select means are respectively in leading and lagging phase relationship with respect to the other of said signal processing means that is selected; and said control means, on a subsequent cycle, being responsive to the one of said lead and lag signals provided by said phase lock loop means for controlling said select means for selecting the corresponding one of the leading and lagging signal processing means that has stabilized over at least the previous cycle and for setting the remaining two unselected signal processing means in leading and lagging phase relationship, respectively, with respect to the frequency of the selected signal processing means.

35. The signal processor circuit of claim 34, constructed entirely on a single integrated circuit chip.

36. The circuit according to claim 27, wherein each of said signal processing means is an integration filter.

37. The circuit according to claim 36, wherein each of said integration filters is providing weighted integration variable according to a fixed relationship with respect to time over its cycle.

38. The circuit according to claim 28, wherein each of said signal processing means is an integration filter.

39. The circuit according to claim 38, wherein each of said integration filters is providing weighted integration variable according to a fixed relationship with respect to time over its cycle.

40. A signal processing circuit, comprising:
first signal processing means having a first transfer function variable with time over a fixed time period of a first cycle and repeating at a first frequency;
second signal processing means having a second transfer function variable with time over a second cycle equal in length of time to said first cycle and repeating at said frequency, said first transfer function being substantially equal to said second transfer function; and each transfer function being unstable for an initial portion of a cycle when the phase of its frequency is changed;
input means for splitting an input into two substantially equal inputs and respectively feeding said two substantially equal inputs to said first and second signal processing means;
select means for receiving outputs from each of said signal processing means; said select means, in response to a control signal, outputting a selected one of said outputs from said signal processing means;
output means having a circuit output and receiving the output of said select means; and
control means for providing said input control signal to said select means for selecting said first signal processing means without changing its phase and for changing the phase of said second signal processing means for at least one cycle.

41. A circuit according to claim 40, including said control means providing two clock signals out of phase with each other by a fixed amount and for respectively feeding said two clock signals to said first and second signal processing means;
each of said first and said second signal processing means repeating said cycle of said transfer function in phase with the phase of the received clock signal from said control means; and
said control means providing said clock signals substantially of equal frequency.

42. A circuit according to claim 41, including A/D converter means for sampling an input at a frequency substantially greater than said first frequency and producing an output fed to the input of said input means for splitting.

43. A circuit according to claim 41, including phase lock loop means providing, selectively, lead and lag signals to said control means in response to said input; and
said control means being responsive to said lead and lag signals for providing said control signal to said select means to select one of said signal processing means and further providing a set signal to the other of said signal processing means to set its phase relationship with respect to said one of said signal processing means.

44. The signal processor circuit of claim 41, constructed entirely on a single integrated circuit chip.

45. The circuit according to claim 41, wherein each of said signal processing means is an integration filter.

46. The circuit according to claim 45, wherein each of said integration filters is providing weighted integration variable according to a fixed relationship with respect to time over its cycle.

47. A circuit according to claim 41, wherein there are only said two signal processing means; phase lock loop means selectively providing only one of prelead and prelag signals; said control means being responsive to said one of prelead and prelag signals, respectively, for selectively setting the unselected one of said signal processing means in a corresponding one of a leading phase relationship and a lagging phase relationship with respect to the selected signal processing means.

48. A circuit according to claim 41, including third signal processing means substantially identical to said first and second signal processing circuit means;
phase lock loop means selectively providing one of a lead and lag signal to said control means;
said control means maintaining said first, second and third signal processing means in a relationship such that two of said signal processing means that are not selected by said select means are respectively in leading and lagging phase relationship with respect to the other of said signal processing means that is selected; and said control means, on a subsequent cycle, being responsive to the one of said lead and lag signals provided by said phase lock loop means for controlling said select means for selecting the corresponding one of the leading and lagging signal processing means that has stabilized over at least the previous cycle and for setting the remaining two unselected signal processing means in leading and lagging phase relationship, respectively, with respect to the frequency of the selected signal processing means.

* * * * *